United States Patent [19]
McNair-Chaplin

[11] Patent Number: 5,845,565
[45] Date of Patent: Dec. 8, 1998

[54] PEELER

[75] Inventor: Christopher Robert McNair-Chaplin, Truro, United Kingdom

[73] Assignee: Chiaphu Industries Limited, Hong Kong, Hong Kong

[21] Appl. No.: 957,294

[22] Filed: Oct. 24, 1997

[51] Int. Cl.[6] ............................. A47J 17/14; A23N 7/00; B26B 1/00; B26B 7/00
[52] U.S. Cl. .......................... 99/593; 30/123.5; 30/276; 30/289; 30/287; 99/584; 99/588
[58] Field of Search ............................. 99/540, 541, 584, 99/588, 593, 594, 590, 642; 30/123, 123.5, 123.6, 127.7, 276, 289, 287, 277.4, 169; 83/99, 169; 451/344, 449; 452/125; D7/646

[56] References Cited

U.S. PATENT DOCUMENTS

| | | |
|---|---|---|
| 1,830,813 | 11/1931 | Tantz ........................................ 30/276 |
| 3,026,672 | 3/1962 | Szczepanski ......................... 99/588 X |
| 3,195,594 | 7/1965 | Bloomquist et al. ..................... 30/276 |
| 3,292,679 | 12/1966 | Roth ......................................... 30/287 |
| 4,073,056 | 2/1978 | Schaeffer et al. ..................... 99/584 X |
| 4,128,939 | 12/1978 | Schaeffer ................................. 30/123 |
| 4,211,002 | 7/1980 | Kirk ..................................... 99/593 X |
| 4,286,383 | 9/1981 | Farden ..................................... 30/169 |
| 4,348,807 | 9/1982 | Ashdown et al. ..................... 30/123.6 |
| 4,664,165 | 5/1987 | Pollak et al. ............................ 83/99 X |
| 4,776,092 | 10/1988 | Moores et al. ......................... 30/123.5 |
| 4,972,769 | 11/1990 | Cailliot ..................................... 99/593 |
| 5,001,973 | 3/1991 | Holcomb ................................... 99/593 |

*Primary Examiner*—Timothy F. Simone
*Attorney, Agent, or Firm*—Miller, Sisson, Chapman & Nash, P.C.

[57] ABSTRACT

A hand holdable peeler for fruit and vegetables comprises a housing that has an electric motor mounted in the housing to rotate a peeler attachment. The peeler attachment has a central body and a number of planar plastic blades. Each blade has serrations along its leading surface to cut into the peel or outer surface of the fruit or vegetables. The trailing edges of the serrations and a planar trailing edge of the blade clear and scrape the outer surface.

12 Claims, 2 Drawing Sheets

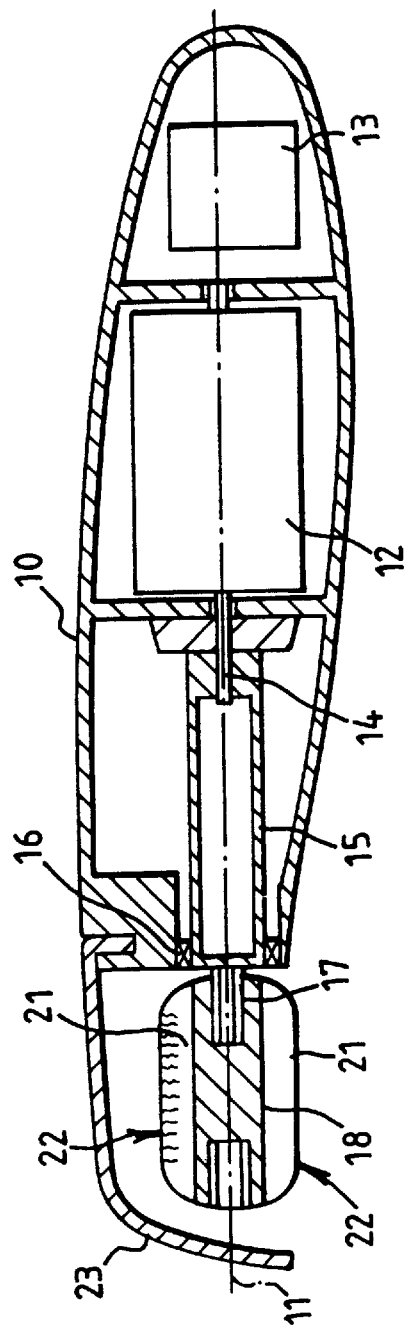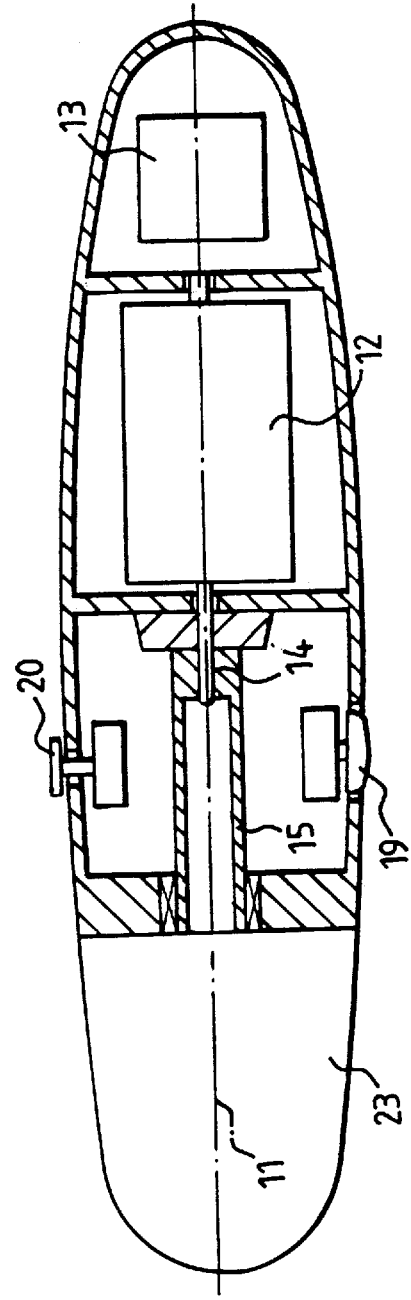

PEELER

BACKGROUND OF THE INVENTION

1. Field of the Invention

The invention relates to peelers.

2. Description of Prior Art

The invention relates more particularly to peelers for fruit and vegetables. Such peelers are widely used for preparing fruit and vegetables for direct consumption or cooking, and comprise special fixed or swivellable cutting blades mounted to handles. There are also mechanically driven peelers available that are driven by electric motors, some of which are hand holdable for use in normal kitchen activities. For various reasons such peelers have not been totally satisfactory because of their mechanical complication, bulkiness, lack of versatility (i.e. to peel a wide variety of types of the fruit and vegetables) and so forth.

SUMMARY OF THE INVENTION

It is an object of the invention to overcome or at least reduce these problems.

According to the invention there is provided a hand holdable peeler for fruit and vegetables comprising a housing having a longitudinal axis, an electric drive motor mounted in the housing and a peeling attachment arranged to be driven by the motor, the peeler attachment comprising a generally cylindrical elongate body supported to rotate about the longitudinal axis having a number of outwardly extending generally planar blades distributed around the longitudinal axis with their outer edges extending lengthwise along the body with planes generally parallel to the longitudinal axis, in which the blades have cutting serrations formed in leading surfaces adjacent the outer edges arranged so that in use the serrations cut into outer surfaces of the fruit and vegetables and then outer edges scrape the surfaces.

Intermediate blades may be included, mounted between the other blades, that are formed with planar leading surfaces.

Outer edges of the blades at at least one end of the body may be curved inwards towards the longitudinal axis to enable ends of the blades to contact surfaces of indentations in the outer surfaces of the fruit and vegetables in use.

A protective hood may be provided at one end of the housing which extends substantially over the peeler attachment. The hood may be a sliding fit to the housing.

A manually operable electric switch may be provided for controlling the direction of rotation of the motor.

The peeler attachment may be arranged to be mounted to a shaft driven by the motor. The peeler attachment may be mountable to the shaft from either of its ends.

The blades are preferably mounted on the body with their planes in a trailing configuration. The edges of the blades may be each configured in a helix configuration in plan view.

A re-chargeable battery compartment may be provided in the housing.

The blades are preferably formed of plastic material.

BRIEF DESCRIPTION OF THE DRAWINGS

A hand holdable peeler according to the invention will now be described by way of example with reference to the accompanying drawings in which:

FIG. 1 is a schematic sectional side view of the peeler with a hood partly cut-away;

FIG. 2 is a schematic part-sectional top view of the peeler;

DESCRIPTION OF THE PREFERRED EMBODIMENT

Figure 4:
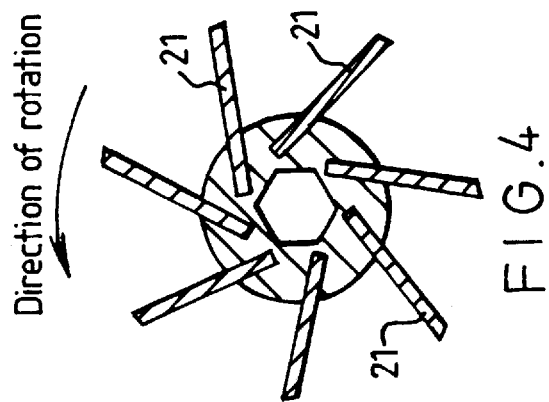
FIG. 4 is a sectional end view of the peeler attachment.

Referring to the drawings, in FIGS. 1 and 2 the peeler comprises an elongate housing 10 having a longitudinal axis 11. An electric motor 12 is mounted in the housing 10 and supplied with power from a battery 13. A motor shaft 14 is coupled to a drive shaft 15 which extends forwards and is supported by a bearing 16. A remote end of the shaft 15 fits into a central hexagonal aperture 17 in a generally cylindrical peeler attachment body 18. An electrical ON-OFF switch 19 and a reversing switch 20 are mounted in opposite sides of the housing 10. The peeler attachment has a number of planar blades 21 supported by the body 18 as more fully explained below. Outer edges 22 of the blades 21 lie along planes generally parallel to the longitudinal axis 11. A protective hood 23 is slidably fitted to an end of the housing 10 and substantially covers the whole of the peeler attachment.

Figure 3:
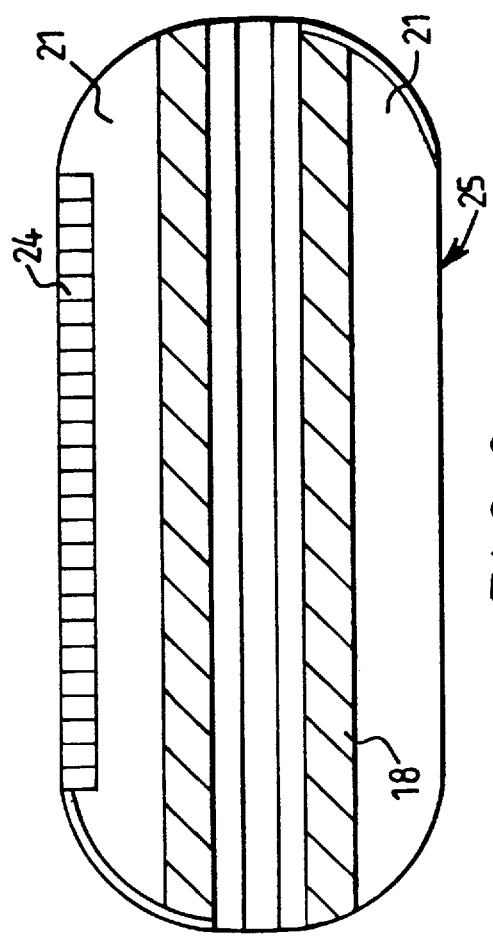
FIG. 3 is a sectional side view of a peeler attachment.
Figure 5:
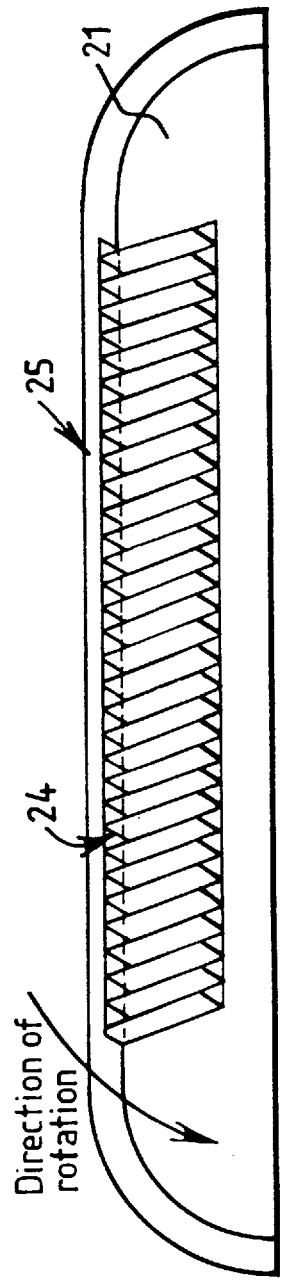
FIG. 5 is an isometric view of a blade for the peeler attachment.

In FIG. 3, it can be seen that a leading outer surface 24 of each blade is serrated along adjacent its outer edge to provide cutting edges whereas trailing edges 25 are planar (i.e. not serrated). The serrations, as can be seen more clearly in FIG. 4, extend about half way across the width of the outer edges of each blade. The surface that extends across the outer edge of each blade is also inclined to some extent so that a plane of this surface lies generally along a respective tangent of the longitudinal axis 11 (FIGS. 1 and 2). Importantly, it will also be noted in this preferred embodiment that the blades are mounted in a trailing configuration, see FIG. 5. The top edges of the blades may be somewhat inclined to the longitudinal axis 11 or similarly formed in a relative helix configuration when viewed in plan.

The blades 21 may also be differently configurated or relatively mounted in the body 18 and for example mounted to lie more closely along radii of the longitudinal axis 11. Generally stated, such blades will in use tend to take deeper cuts from the surfaces of the fruit and vegetables, which in some applications may be preferred.

The outer edges of the blades are curved at their ends towards the longitudinal axis 11. In fact only one end of each blade might be curved if the attachment is not made so as to be reversibly mountable end to end to the drive shaft 15. In any event, curvature of the blades at the remote end of the peeler attachment enables the peeler to peel or clean up surfaces in regions of any indentations in the fruit or vegetables as normally required during preparation of the fruit and vegetables. The serrations may extend or be present in the curved parts of the blade.

In use, the peeler is brought up against the surfaces of the fruit or vegetables to be peeled or prepared in the normal way. The edges of the blades are pressed against the surface of the fruit or vegetables and the peeler stroked in a direction transverse to the longitudinal axis 11 across the surface. The serrations 24 cut into an outer layer of the surface and the trailing edges of the serrations and the planar parts 25 then clear and scrape the surface as the peeler attachment is rotated by the motor. Indentations in the surface can be peeled or scraped by the curved parts of the blades at the remote end of the peeler attachment and even imperfections, such as "eyes" of potatoes, "dug out" by pressing the curved parts against the surfaces to remove such damaged or unsightly blemishes in the fruit or vegetables. Should the user be left-handed or prefer a left-handed operation, the peeler can be conveniently adapted by reversing the peeler attachment end to end and switching the motor to rotate an opposite rotational direction.

Some of the blades, or additional intermediate blades, shown in the drawings may be formed without serrations. It is possible to provide some blades where the serrations may extend completely across the width of the blade.

Whereas the outer edges of the blades are shown extending parallel to the longitudinal axis 11, the outer edges may be inclined to some extent so that the peeler attachment is overall somewhat conical-shaped. However in such an arrangement the outer edges remain "generally parallel to the longitudinal axis". Such a peeler attachment cannot normally be reversibly attached to the peeler.

The hood 23 is preferably slidably removable to facilitate cleaning and can be conveniently formed of see-through material to enable the user to have a clearer view of the fruit or vegetable surface to which the blades are being applied during use. The peeler attachment and especially the blades are preferably formed of plastic material, but the blades may be formed of metallic material.

The battery 13 may be a re-chargeable battery and/or the motor 12 may be arranged to be supplied from a mains supply, normally via an isolation transformer and an electric cable attached to the end of the housing 10 remote from the peeler attachment. Where the battery is re-chargeable, the housing includes a compartment for the re-chargeable battery arranged so that the battery is easily removable for charging. In one embodiment, the housing includes a re-charging socket for use to allow the battery to be re-charged in situ. The battery may in some cases be maintained in a charged condition by an induction charging arrangement known per se, provided in a peeler mounting/storing bracket.

I claim:

1. A hand holdable peeler for fruit and vegetables comprising a housing having a longitudinal axis, an electric drive motor mounted in the housing and a peeling attachment arranged to be driven by the motor, the peeler attachment comprising a generally cylindrical elongate body supported to rotate about the longitudinal axis having a number of outwardly extending generally planar blades distributed around the longitudinal axis with their outer edges extending lengthwise along the body with planes generally parallel to the longitudinal axis, in which the blades have cutting serrations formed in leading surfaces adjacent the outer edges arranged so that in use the serrations cut into outer surfaces of the fruit and vegetables and then outer edges scrape the surfaces.

2. A hand holdable peeler according to claim 1, including intermediate blades that are formed with planar leading surfaces.

3. A hand holdable peeler according to claim 1, in which outer edges of the blades at at least one end of the body are curved inwards towards the longitudinal axis to enable ends of the blades to contact surfaces of indentations in the outer surfaces of the fruit and vegetables in use.

4. A hand holdable peeler according to claim 1, including a protective hood that is provided at one end of the housing which extends over the peeler attachment.

5. A hand holdable peeler according to claim 4, in which the hood is a sliding fit to the housing.

6. A hand holdable peeler according to claim 1, including a manually operable electric switch for controlling the direction of rotation of the motor.

7. A hand holdable peeler according to claim 1, in which the peeler attachment is arranged to be mounted to a shaft driven by the motor.

8. A hand holdable peeler according to claim 7, in which the peeler attachment is mountable to the shaft from either of its ends.

9. A hand holdable peeler according to claim 1, in which the blades are mounted on the body with their planes in a trailing configuration.

10. A peeler according to claim 1, in which the edges of the blades are each configured in a helix configuration in plan view.

11. A peeler according to claim 1, including a re-chargeable battery compartment provided in the housing.

12. A peeler according to claim 1, in which the blades are formed of plastic material.

* * * * *